United States Patent

[11] 3,582,690

[72] Inventor Alexander J. Yerman
Scotia, N.Y.
[21] Appl. No. 831,472
[22] Filed June 9, 1969
[45] Patented June 1, 1971
[73] Assignee General Electric Company

[54] SEMICONDUCTOR STRAIN SENSOR WITH CONTROLLED SENSITIVITY
6 Claims, 7 Drawing Figs.
[52] U.S. Cl.................................................. 307/308,
73/88.5, 307/278
[51] Int. Cl................................................H03k 17/00
[50] Field of Search........................................... 307/278,
308

[56] References Cited
UNITED STATES PATENTS
3,248,654 4/1966 Shiraqaki...................... 307/308X
3,351,786 11/1967 Muller et al. .................. 307/308X
3,492,861 2/1970 Jund............................. 307/308
3,510,696 5/1970 Bargen et al.................. 307/308

Primary Examiner—Donald D. Forrer
Assistant Examiner—B. P. Davis
Attorneys—John F. Ahern, Paul A. Frank, Donald R. Campbell, Joseph B. Forman, Frank L. Neuhauser and Oscar B. Waddell ABSTRACT: A field effect transistor is used as a controlled sensitivity strain sensor by varying the gate-to-source voltage or other equivalent gate electrode parameter to change the strain sensitivity of conduction through the channel. In general, the gage factor decreases as the gate-to-source voltage is increased. Applications include temperature compensation and scale linearization.

PATENTED JUN 1 1971

Inventor:
Alexander J. Yerman,
by Donald R. Campbell
His Attorney.

SEMICONDUCTOR STRAIN SENSOR WITH CONTROLLED SENSITIVITY

This invention relates to semiconductor strain gages which exhibit a change in resistance as a function of an applied strain, and more particularly to semiconductor strain sensors with a controlled strain sensitivity.

Certain semiconductors such as silicon and germanium have large gage factors and consequently have been employed as stain gages for sensing various types of stresses. The high gage factors, where gage factor is defined as the fractional change in resistance per unit strain, are due to the fact that the piezoresistive effect resulting from the strain-induced modulation of the conduction mechanism of the semiconductor is especially pronounced in these materials. A desirable feature in the use of semiconductor strain sensors would be the ability to control the strain sensitivity of the sensor. This refers to the capability of changing in a predetermined manner the strain sensitivity or gage factor of the sensor. There are many applications where such control would be useful, as for instance, to compensate for the normal decrease in gage factor of semiconductor strain gages as the temperature increases. Other possible uses include compensation to improve frequency response, improving selectivity for a particular signal input, and scale linearization, expansion, or compression.

The field-effect transistor is suitable to be employed as a sensor for measuring strain. Basically, the field effect transistor comprises a layer of semiconductor material constituting a channel for majority charge carrier flow between source and drain electrodes, the conductivity of the channel being controlled by the voltage applied to a gate electrode overlying the channel between the source and drain electrodes. When subjected to a strain, the resistance of the conducting channel changes in dependence on the amount of the strain. It has not heretofore been recognized, however, that the gage factor, or strain sensitivity, of a field effect transistor, or a device by whatever name having a similar physical structure, can be controlled by means of varying the voltage on the gate electrode.

Accordingly, an object of the invention is to provide a new and improved semiconductor strain sensor having a controllable or variable strain sensitivity.

Another object is the provision of a semiconductor strain sensor with a voltage-controlled gage factor, taking the form of a field-effect transistor employed in a circuit as a device for sensing strain.

Yet another object is to provide a compensated strain gage device incorporating a semiconductor strain sensing field-effect transistor whose strain sensitivity is varied as a function of a preselected parameter such as temperature or frequency, or input strain magnitude.

In accordance with the invention, a controlled sensitivity semiconductor strain sensor comprises a strain sensitive device having first and second electrodes and a body of semiconductor therebetween providing a channel for charge carrier flow, and a third electrode overlying the channel to which a voltage is applied for controlling the conductivity of the channel. Means are provided for applying a voltage between the first and second electrodes and between the first and third electrodes, and for subjecting the device to a strain. A selected third electrode parameter is varied to thereby change the strain sensitivity of the device, which is preferably a field effect transistor wherein the gate-to-source voltage is the parameter that is adjustable and modulates the strain sensitivity of the channel.

The foregoing and other objects, features, and advantages of the invention will be apparent from the following more particular description of several preferred embodiments of the invention, as illustrated in the accompanying drawings wherein.

Figure 4:
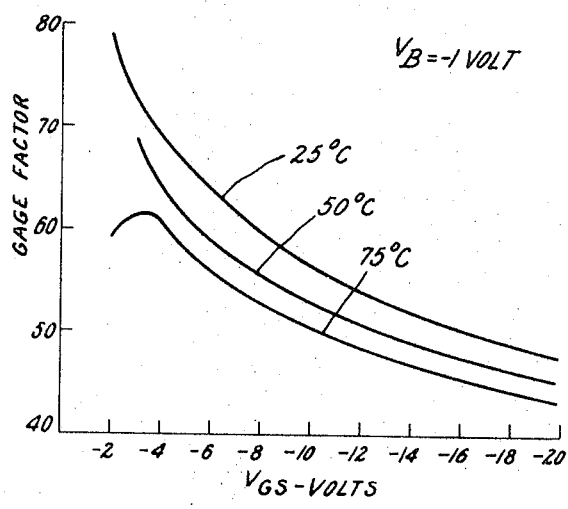
Figure 5:
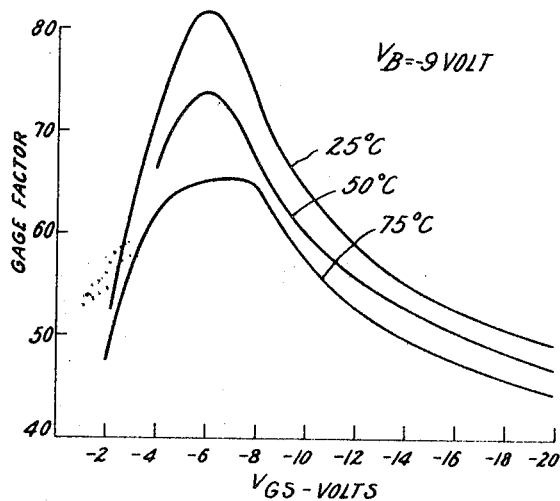
Figure 6:
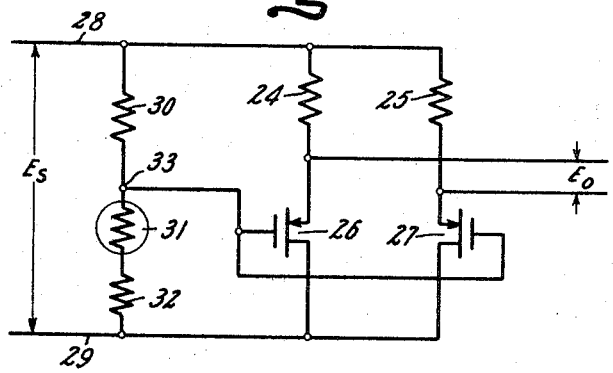
Figure 7:
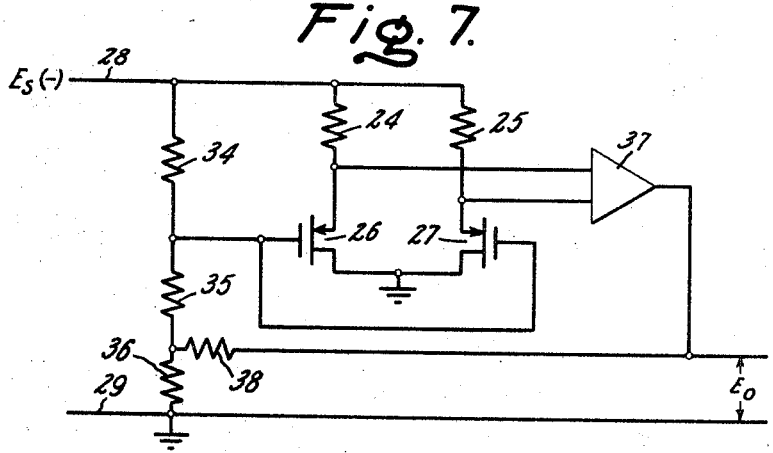

FIGS. 4 and 5 each show a series of curves of gage factor vs. gate-to-source voltage for different ambient temperatures for each of the two values of bridge voltage, respectively;

FIG. 6 is a schematic circuit diagram of a bridge circuit with a field effect transistor strain sensor connected so that the gate voltage is varied as a function of temperature, to compensate for changes in sensitivity due to temperature; and FIG. 7 is similar to FIG. 6 but illustrates a field effect transistor strain sensor whose sensitivity is controlled for scale linearization purposes.

Figure 1:
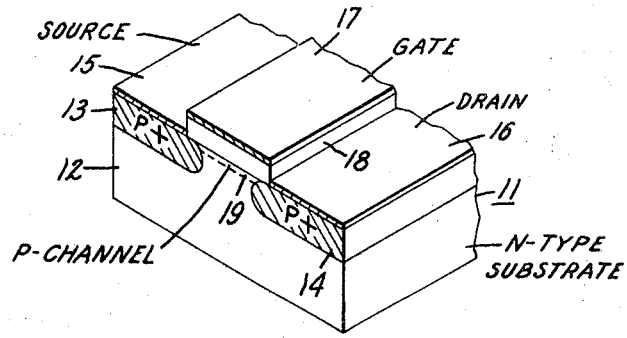
FIG. 1 is a cross-sectional isometric view of one type of insulated-gate field effect transistor that can be used as a voltage controlled strain sensor according to the teaching of the invention.
Figure 2:
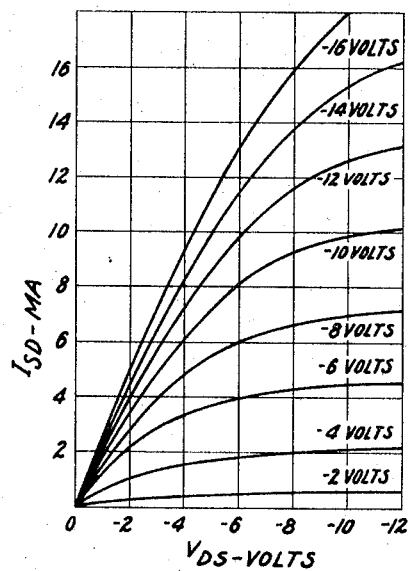
FIG. 2 is a typical set of current-voltage characteristic curves for different values of gate-to-source voltage for the field-effect transistor shown in FIG. 1.

Although other types of field effect transistors can be used as sensitivity controlled strain sensors, the device 11 shown in FIG. 1 by way of illustration is a $p$-channel enhancement mode metal-oxide-semiconductor (MOS) field effect transistor. This form of insulated gate field effect transistor is well known in the art and will be described only briefly. The device 11 is formed at one surface of an $n$-type substrate 12 made of silicon or other suitable semiconductor material and comprises two spaced regions 13 and 14 of heavily doped $p$-type silicon providing respectively the source and drain electrodes. Ohmic metallic contacts 15 and 16 made for instance of aluminum partially overlie the source electrode 13 and drain electrode 14 and make connection to a supply of source-to-drain voltage (not here shown). A metallic gate electrode 17 is deposited on a layer of insulating material of silicon dioxide, for example, which in turn overlies the surface of the substrate 12 between the source electrode 13 and drain electrode 14 and partially overlaps each of these electrodes. A separate contact is usually provided for the substrate which is not shown. This is frequently connected to the source electrode and such a connection is assumed in the following description. The gate electrode 17 is connected to a suitable supply of gate-to-source voltage. Assuming that the drain electrode 14 is biased negative with respect to the source electrode 13, then a negative voltage applied to the gate electrode 17 in excess of a certain threshold voltage characteristic of the device creates an electrostatic field that attracts the positively charged charge carriers, or holes, in the $n$-type substrate 12 and creates a $p$-channel 19 between the source and drain electrodes 13 and 14 thereby rendering the device conductive. As will be observed from a typical set of current-voltage characteristic curves given in FIG. 2, the output current $I_{SD}$ for a preselected value of drain-to-source voltage $V_{DS}$ increases as the gate-to-source voltage $V_{GS}$ increases.

As has been pointed out, the filed effect transistor can be used as a semiconductor strain sensor. For such applications, the field effect transistor 11 is suitably mounted to be subjected to a strain in order to sense force, pressure, strain, acceleration, displacement, or any other parameter of interest by suitable coupling of the parameter to generate the strain required. The field effect transistor strain sensor may be for example mounted on or integrally formed in or on a flexible diaphragm to sense pressure, or a cantilever beam to sense force, displacement, or acceleration. In the arrangement shown in FIG. 3, the field effect transistor strain sensor 11 is formed integrally on or in one surface of a semiconductor cantilever beam 21 secured at one end to a support 22, to sense the strain induced by a force applied to the free end of the beam. When the field effect transistor 11 is connected in a suitable resistance measuring circuit such as a resistance divider or a Wheatstone bridge, the resistance of the strain sensor varies in accordance with the strain to which it is subjected, which in turn is a function of the applied force. Preferably, the beam 21 is made of single crystal silicon, and the gage factor of the field effect transistor strain sensor 11 is determined in known manner to a first order by the crystallographic plane and the direction of the conduction channel within the plane. To review the latter briefly, the piezoresistance coefficients in a crystal or semiconductor material such as silicon are related to the crystallographic axes of the crystal In silicon or other materials having diamond-cubic symmetry, three coefficients serve to completely define the piezoresistance characteristics. These fundamental piezoresistance coefficients $\pi_{11}$, $\pi_{12}$, and $\pi_{44}$ serve to define the sensitivity to longitudinal, transverse, and shear stresses respectively Of more practical usefulness are the piezoresistance constants which are derived from these coefficients and includes the dependence on direction in the crystal. From these, it is customary to derive a set of gage factors expressed in terms of longitudinal and transverse strains. These gage factors also incorporate the anisotropic elastic coefficients of the crystal. In general, for a given material, they vary with direction in the crystal and with dopant concentration. Specifically, the longitudinal gage factor for a specific direction within the crystal refers to the fractional change in resistance per unit strain when current and strain directions are parallel:

$$GF_L = \frac{\Delta R}{R \epsilon_L}$$

The transverse gage factor is similar except that current and strain directions are perpendicular to each other:

$$GF_T = \frac{\Delta R}{R \epsilon_T}$$

Certain orientations within a silicon crystal give high sensitivity to strain, while others show very low sensitivity. For example, in p-type silicon of 7.8 ohm-cm. resistivity, using the data given in the article "Piezoresistance Effect in Germanium and Silicon" by Charles S. Smith, Physical Review 94, No. 1, 42—49, 1954, the variations in longitudinal and transverse gage factors with crystal directions can be calculated and are shown in Table 1.

TABLE 1

Effect of Crystal Direction on Longitudinal and Transverse Gage Factor in p-Type Silicon (7.8Ω-cm.)

| Direction | | | |
|---|---|---|---|
| Current | Strain | $GF_L$ | $GF_T$ |
| <111> | <111> | +175 | |
| <111> | <1̄10> | | −75 |
| <110> | <110> | +120 | |
| <110> | <1̄10> | | −112 |
| <100> | <100> | +8 | |
| <100> | <010> | | −1 |

Figure 3:
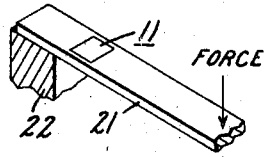
FIG. 3 is a perspective view of a cantilever beam device having an integrally formed field effect transistor strain sensor.

In general, there is found the same first order dependence on crystal direction in field effect transistors taking the channel current direction as the pertinent parameter. For example, in the case of the cantilever shown in FIG. 3, when the plane of the cantilever is (110), and the direction of current flow through the channel is parallel to the long dimension of the cantilever is a <111> direction, maximum sensitivity to bending strain results for a p-channel field effect transistor. With reference to FIGS. 1 and 3, the device 11 will then be oriented with the direction of charge carrier flow in the p-channel 19 parallel to the longitudinal axis of the beam 21. This is, of course, not the only configuration of practical value but is illustrative of the fact that reasonably high gage factors in the order of 100 or more can be obtained by properly choosing the plane of silicon from which the beam 21 is made, and the orientation of the field effect transistor strain sensor 11 on the beam. The criteria for making these selections are exactly the same as for other types of semiconductor strain sensors.

The field effect transistor when used as a strain sensor is different from conventional strain sensors, however, in that the strain sensitivity of conduction through the channel is affected by the voltage present on the gate electrode. FIGS. 4 and 5 each show typical variations in gage factor as a function of the voltage applied between the gate and source electrodes ($V_{GS}$) at three different temperatures as indicated, namely 25°, 50°, and 75° C. This data was obtained from a p-channel enhancement mode metal-oxide silicon field effect transistor formed on a (111) plane of single crystal silicon with the channel strained in the longitudinal direction, i.e., <110> The test circuit was a Wheatstone bridge circuit having in the other arms a reference field effect transistor and two identical resistors, and FIG. 4 shows the data obtained when the bridge supply voltage, $V_B$, is −1 volt, while in FIG. 5 $V_B$ is −9 volts.

Neglecting for a moment the extreme left-hand portions of the curves, FIGS. 4 and 5 illustrate the large decrease in gage factor as $V_{GS}$ is increased. The change in gage factor for the higher drain-to-source voltages used to obtain the data in FIG. 5 can be a ratio of almost 2:1. The erratic behavior below −4 volts in FIG. 4 and below about −6 volts in FIG. 5 is probably due to another effect becoming significant. It will be noted that the gage factors obtained with a bridge voltage of −9 volts are slightly higher than the corresponding values obtained using a bridge voltage of −1 volt, and the temperature sensitivity of the gage factor is somewhat higher also. This gage factor temperature sensitivity behavior compares qualitatively with that of p-type silicon of moderately high dopant concentration. Although the reasons for the decrease in gage factor as the gate voltage is increased are not known with certainty, a possible explanation accounting for this variation in gage factor with gate voltage is the change in carrier concentration and mobility with gate voltage and channel voltage, respectively. At low values of $V_{GS}$, the number of charge carriers in the channel 19 (see FIG. 1) by reason of the electrostatic field created by the gate electrode 17 is low, and since the carrier concentration is low, there is a resulting high gage factor. As carrier concentration is increased due to increases in $V_{GS}$, or the mobility of the charge carriers is increased due to the reduction of $V_{DS}$, the gage factor is reduced. This is somewhat analogous to the changes in gage factor as a function of doping level in silicon. Such a mechanism also would account for the variation in temperature sensitivity observed. A higher temperature sensitivity is expected coincident with higher gage factors, and hence lower carrier concentration. That the relationship between $V_{GS}$ and gage factor is not due to power dissipation and self-heating of the channel (which might be expected to increase channel temperature as $V_{GS}$ is increased), can be ruled out by the fact that the gage factors are higher for the case where $V_B = -9$ volts and channel power dissipation is almost 100 times higher than the corresponding cases where $V_B = -1$ volt.

Other types of insulated gate field effect and also junction field effect transistors can be employed in a similar manner as sensitivity controlled semiconductor strain sensors. More specifically, there are four types of metal-oxide-semiconductor field effect transistors including in addition to the p-channel enhancement mode transistor that has been mentioned, an n-channel enhancement mode transistor and both p-channel and n-channel depletion mode transistors. The n-channel enhancement mode type is similar to the p-channel enhancement mode transistor but comprises heavily doped n-type region source and drain electrodes on a p-type substrate, and the charge carriers that the form the conducting channels are electrons instead of holes. Depletion-type transistors have a physical structure similar to that shown in FIG. 1 but are fabricated with source, drain, and channel regions made of the same conductivity type material to yield substantial drain current at zero gate bias. As appropriate gate polarity voltage is applied to the gate electrode, increasing the gate voltage causes the electrostatic field to deplete the charge carriers in the channel until the channel is pinched off and the device is nonconductive. Another type of insulating gate field effect transistor is known as the thin film transistor and commonly comprises an evaporated thin film of semiconductor such as cadmium sulfide with a control gate insulated from the semiconductor. The thin film transistor is described more fully in the Proceedings of the IRE, June 1962, pages 1462—1469. The junction field effect transistor essentially comprises a high resistivity semiconductor constituting a channel for majority carrier flow between 2 ohmic source and drain contacts, with one or two regions of opposite conductivity type and high doping providing the gate electrode or electrodes. With the gate reverse biased relative to the channel using a low bias voltage, a large current can flow through the channel from source to drain, however when the reverse bias is increased a point is reached where the entire channel is pinched off and no current can flow.

The foregoing review of different types of field effect transistors is not necessarily comprehensive and the invention is not limited to those which have been mentioned. In fact, any semiconductor device by whatever name which has the essential structural and operating characteristics of a field effect transistor can be used as a sensitivity controlled strain sensor. Basically, the device comprises a layer of semiconductor material constituting a channel for majority charge carrier flow between source and drain electrodes, where the conductivity of the channel is controlled by the voltage applied to a gate electrode overlying at least a portion of the channel between the source and drain electrodes. All of such devices when used as a strain sensor are characterized by the ability to control the strain sensitivity by reason of the fact that the gage factor of the device changes as the gate voltage is increased.

Two applications for the controlled variable sensitivity semiconductor strain sensor will be discussed, although other ways of utilizing the effect are possible and apparent to those conversant with instrument transducer design. These are to compensate for changes in sensitivity of a semiconductor strain sensor due to temperature changes, and for scale linearization purposes to compensate for the inherent nonlinearity of semiconductor strain sensors. In FIG. 6, a full bridge circuit is shown that includes a temperature compensated field effect transistor strain sensor. The circuit comprises two resistors 24 and 25 and two MOS field effect transistors 26 and 27 connected as the four arms of a Wheatstone bridge that is energized by a source of potential $E_s$ connected between the two DC supply terminals 28 and 29. The unbalance output voltage $E_o$ appears between the other two junctions of the bridge. Transistor 26 is the strain sensor while transistor 27 is an identical type unstrained or reference transistor. A variable source-to-gate voltage that changes as a function of the temperature is applied in parallel to the gates of both transistors. To this end, a resistor voltage divider network comprising the series connected resistor 30, temperature sensitive thermistor 31 and resistor 32 is connected between the DC supply terminals, and the source and gate electrodes of each transistor 26 and 27 are coupled across the last two mentioned resistive elements. The resistance values can be chosen such that as the resistance of the thermistor 31 changes in accordance with the second value of temperature, the variable gate-to-source voltage that is developed changes the gage factor of the strain sensor transistor 26 to compensate for the variation in sensitivity due to temperature. The gate voltage applied to unstrained transistor 27 is the same as that applied to strained transistor 26 in order to maintain constant bridge relationships.

In FIG. 7 the controlled sensitivity field effect transistor 26 is employed in a similar Wheatstone bridge arrangement that includes circuitry for compensating for nonlinearity of readout. The typical p-type silicon $\Delta R/R$ vs. strain characteristic, for example, is not linear. In this circuit the gate-to-source voltage is varied as a function of the unbalance output voltage $E_o$ of the bridge. For this purpose, a resistor voltage divider comprising resistors 34, 35, and 36 are connected between the DC supply terminals 28 and 29, where terminal 28 is assumed to be negative while terminal 29 is grounded, and the junction point of resistors 34 and 35 is coupled to the gates of transistors 26 and 27, the source electrodes of which are grounded. The unbalance voltage $E_o$ appears between ground and the output of a differential amplifier 37 whose inputs are respectively the voltages at the junctions between resistor 24 and transistor 26, and resistor 25 and transistor 27, in the bridge. The output of differential amplifier 37, which must be negative going relative to ground, is also fed back through resistor 38 to the junction between resistors 35 and 36, and a portion of it is effective in the resistor divider network comprising resistors 34, 35, and 36 to change the voltage at the junction of resistors 34 and 35, which is the gate voltage of transistors 26 and 27, in a direction to compensate for the inherent scale nonlinearity. For this circuit, as the strain is increased the output voltage $E_o$ increases and goes more negative, and the feedback effect drives the gate-to-source voltage more negative than it would be otherwise. This is in the direction FIGS. 4 and 5) to decrease the gage factor and consequently linearize the output voltage.

While not here illustrated, enhanced strain sensitivity can be achieved by cascading similar type field effect transistors that are subjected to the same stress, e.g., by applying them to opposite sides of a cantilever beam, or by employing two complementary type MOS transistors so that one has a positive output and the other has a negative-output and the outputs are added algebraically.

In summary, it has been found that a controlled variable sensitivity semiconductor strain sensor can be provided by a field effect transistor by varying the gate-to-source voltage to thereby modulate the gage factor. The effect is applicable in any of the various types of field effect transistors, or in semiconductor structures basically like that of the field effect transistor, and is not necessarily restricted to changing the gate voltage, since the same result could be accomplished by changing some other gate electrode parameter such as by physically moving the gate electrode (the gate voltage remaining constant) to modulate the conduction mechanism of the semiconductor material in an equivalent manner. The controlled sensitivity semiconductor strain sensor can be implemented by simple additions to conventional strain-measuring circuitry and has utility in various instrument transducer applications where some electromechanical parameter is to be measured. In particular it provides a new and improved means for improving the characteristics of such instrument transducers by providing a mechanism for temperature compensating or linearizing the scale of these transducers.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United is:

1. A controlled sensitivity semiconductor strain sensor comprising:

a strain sensitive device having first and second electrodes and a body of semiconductor therebetween providing a channel for charge carrier flow, and a third electrode overlying at least a portion of the channel to which a voltage is applied for controlling the conductivity of the channel, means for applying a voltage between said first and second electrodes and between said first and third electrodes, means for subjecting said device to a strain, and means for varying a selected third electrode parameter to thereby change the strain sensitivity of the device comprising means for sensing a phenomenon to be controlled, and means for varying the selected third electrode parameter in accordance with the sensed value of the phenomenon to be controlled.

2. A controlled sensitivity semiconductor strain sensor device comprising:

a field effect transistor having source and drain electrodes and a body of semiconductor therebetween providing a channel for majority charge carrier flow, and a gate electrode overlying at least a portion of the channel to which a voltage is applied for controlling the conductivity of the channel, means for subjecting said field effect transistor to a strain, circuit means for applying voltage between said source and drain electrodes and for detecting the change in resistance that occurs as the result of the strain, and means for applying an adjustable gate-to-source voltage that is a function of a phenomenon to be controlled, to thereby change the strain sensitivity of the field effect transistor.

3. A device as set forth in claim 2 wherein said circuit means is a bridge circuit including at least two field effect transistors, and said means for applying an adjustable gate-to-source voltage applies the same gate-to-source voltage to both of said field effect transistors.

4. A device as set forth in claim 3 wherein said field effect transistors are $p$-type silicon insulated gate field effect transistors.

5. A device as set forth in claim 2 wherein said means for applying an adjustable gate-to-source voltage that is a function of a phenomenon to be controlled comprises means for sensing the ambient temperature, and means for generating a voltage that is a function of the sensed value of temperature.

6. A device as set forth in claim 2 wherein said circuit means includes means for generating an output voltage indicative of the change in resistance, and said means for applying an adjustable gate-to-source voltage that is a function of a phenomenon to be controlled includes feedback means for coupling at least a portion of said output voltage thereto to result in linearizing said output voltage.